United States Patent
Georgescu et al.

(10) Patent No.: US 10,210,656 B2
(45) Date of Patent: Feb. 19, 2019

(54) METHOD AND APPARATUS FOR SEARCHING A DATABASE OF 3D ITEMS USING DESCRIPTORS

(71) Applicant: Fujitsu Limited, Kawasaki-shi, Kanagawa (JP)

(72) Inventors: Serban Georgescu, London (GB); Peter Chow, Gillingham (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/474,304

(22) Filed: Mar. 30, 2017

(65) Prior Publication Data
US 2017/0337733 A1    Nov. 23, 2017

(30) Foreign Application Priority Data

May 17, 2016 (DE) .................. 10 2016 208 436
May 17, 2016 (GB) .................. 1608645.6

(51) Int. Cl.
| | |
|---|---|
| *G06F 17/30* | (2006.01) |
| *G06T 17/20* | (2006.01) |
| *G06T 7/00* | (2017.01) |
| *G06K 9/00* | (2006.01) |
| *G06K 9/46* | (2006.01) |

(52) U.S. Cl.
CPC ........ *G06T 17/20* (2013.01); *G06F 17/30256* (2013.01); *G06K 9/00208* (2013.01); *G06K 9/4623* (2013.01); *G06T 7/97* (2017.01)

(58) Field of Classification Search
None
See application file for complete search history.

(56) References Cited

U.S. PATENT DOCUMENTS

| | | |
|---|---|---|
| 9,171,011 B1 | 10/2015 | Brewington |
| 2009/0138468 A1 | 5/2009 | Kurihara |
| 2011/0047140 A1 | 2/2011 | Free |
| 2011/0091112 A1 | 4/2011 | Engtröm et al. |
| 2013/0051647 A1 | 2/2013 | Miao et al. |

(Continued)

FOREIGN PATENT DOCUMENTS

| | | |
|---|---|---|
| EP | 0559594 A1 | 9/1993 |
| WO | WO 2016/001920 A1 | 1/2016 |

OTHER PUBLICATIONS

Chao, W., Introduction to Pattern Recognition, Oct. 2009, Graduate Institute of Communication Engineering, pp. 1-31.*

(Continued)

*Primary Examiner* — Said Broome
(74) *Attorney, Agent, or Firm* — Staas & Halsey LLP (57) ABSTRACT

A method and apparatus for searching a database of 3D items using descriptors created for each item and for the 3D computer-generated model or the 3D physical object. The descriptor comprises a vector string comprising each of the feature vectors extracted from the images, and dimension-related features each representing a dimensional feature. The descriptor is created by obtaining 2D rendered images of the model by rotating the model about each different axis independently, and extracting a feature vector representing features. The model is rotated about the axes in angular steps which may be the same for each axis. The axes may comprise three mutually-perpendicular axes, where each angular step is in the range from 30° to 45°.

5 Claims, 7 Drawing Sheets

(56) References Cited

U.S. PATENT DOCUMENTS

| | | |
|---|---|---|
| 2015/0139569 A1 | 5/2015 | Raichelgauz et al. |
| 2015/0161821 A1 | 6/2015 | Mazula |
| 2015/0178321 A1 | 6/2015 | Rivlin et al. |
| 2015/0287117 A1 | 10/2015 | Tan |
| 2016/0063035 A1 | 3/2016 | Rejal et al. |

OTHER PUBLICATIONS

Su, H., Maji, S., Kalogerakis, E., Learned-Miller, E., Multi-view Convolutional Neural Networks for 3D Shape Recognition, May 2015, 2015 IEEE Internatioal Conference on Computer Vision, edition 1, pp. 1-9.*

Extended European Search Report dated Oct. 25, 2017 in corresponding European Patent Application No. 17163735.8.

Su Hang et al.: "Multi-view Convolutional Neural Networks for 3D Shape Recognition," 2015 IEEE International Conference on Computer Vision (ICCV), IEEE, Dec. 7, 2015, pp. 945-953, XP032866419 **.

British Search Report dated Jul. 3, 2017 in corresponding British Patent Application No. GB1608645.6.

Szegedy et al., "Going Deeper with Convolutions", CVPR2015 open access, The IEEE Conference on Computer Vision and Pattern Recognition, 2015, Abstract (1 page).

Su et al., "Multi-View Convolutional Neural Networks for 3D Shape Recognition", ICCV 2015 open access, The IEEE International Conference on Computer Vision, 2015, Abstract (1 page).

Krizhevsky et al., "ImageNet Classification with Deep Convolutional Neural Networks", 2012, pp. 1-9.

"The Programmers Solid 3D CAD Modeller" OpenSCAD, Retrieved on Mar. 15, 2017 from url: http://www.openscad.org/.

Great Britain Search Report dated Nov. 17, 2016 in corresponding Foreign Patent Application No. GB1608645.6.

German Search Report dated Dec. 27, 2016 in corresponding Foreign Patent Application No. 10 2016 208 436.4.

Del Bimbo et al., "Content-Based Retrieval of 3D Models", Dipartimento Sistemi e Informatica Universita di Firenze, Italy, ACM Transactions on Multimedia Computing, Communications and Applications, vol. 2, No. 1, Feb. 2006, pp. 20-43.

Bustos et al., "Content-Based 3D Object Retrieval" 3D Documents, IEEE Computer Society, IEEE Computer Graphics and Applications, Jul./Aug. 2007, pp. 22-27.

Gao et al., "Camera Constraint-Free View-Based 3-D Object Retrieval", IEEE Transactions on Image Processing, vol. 21, No. 4, Apr. 2012, pp. 2269-2281.

Pu et al., "A 2D Sketch-Based User Interface for 3D CAD Model Retrieval", Purdue University, Computer-Aided Design & Applications, vol. 2, No. 6, 2005, pp. 717-725.

"Princeton ModelNet" Retrieved on Mar. 15, 2017 from url: http://modelnet.cs.princeton.edu/.

* cited by examiner

METHOD AND APPARATUS FOR SEARCHING A DATABASE OF 3D ITEMS USING DESCRIPTORS

CROSS-REFERENCE TO RELATED APPLICATIONS

This application claims the benefit of United Kingdom Application No. 1608645.6, filed May 17, 2016, in the United Kingdom Intellectual Property Office, and German Application No. 102016208436.4, filed May 17, 2016, in the German Intellectual Property Office, the disclosures of which are incorporated herein by reference.

BACKGROUND

1. Field

The embodiments relate to a method and apparatus for searching a database of 3D items which make use of descriptors which have been created for each item in the database and for the 3D computer-generated model or the 3D physical object for which a match is sought.

2. Description of the Related Art

In the last 20 years there has been active research in the automatic creation of descriptors (i.e. identifying tags) for 3D models and the use of these descriptors to find similar ones in model databases. Previously-proposed descriptors can be roughly divided into two categories:
1. Shape descriptors that use 3D data directly, such as CAD, mesh data, point clouds, etc.
2. Shape descriptors that only make use of the shape of the 3D model by using one or more 2D projections of the 3D shape It has been shown that the above-mentioned second category of descriptors outperforms the above-mentioned first category, especially when used in conjunction with deep learning networks such as convolutional neural networks. There are two main reasons for this:
1. Projection-based descriptors evaluate the similarity of shapes in way which is very similar to human perception: two 3D models are similar if and only if they look similar from all angles;
2. Deep learning networks for image recognition are much more mature than those for 3D object recognition, owing mainly to the much larger quantity of available images (both labelled and unlabelled) as compared to 3D models.

In addition, since projection-based methods do not need direct access to data and access it only in rendered form, they are not dependent on the data format and its quality.

One previously-proposed, projection-based descriptor is based on the assumption that the 3D models are all in an upright orientation, which is often not the case for models coming from mechanical CAD for example. Furthermore, a rendering process used in creating the previously-proposed, projection-based descriptor loses dimensional information, since all images have the same resolution and the rendered model is scaled to fit; as a result, models that look similar in shape, but are in fact very different in size, will come up as good matches.

It is desirable to provide a more versatile descriptor, and a searching system which uses the descriptor.

SUMMARY

Additional aspects and/or advantages will be set forth in part in the description which follows and, in part, will be apparent from the description, or may be learned by practice of the embodiments.

According to an embodiment of a first aspect there is provided a computer-implemented method of creating a descriptor for a three-dimensional—3D—computer-generated model, comprising: obtaining a plurality of two-dimensional—2D—rendered images of the model from a fixed viewpoint by rotating the model fully about each of a plurality of different axes independently; and extracting from each 2D rendered image a feature vector representing features of the 2D rendered image, wherein the descriptor comprises a vector string comprising each of the extracted feature vectors.

A method embodying the first aspect can provide a fully automatic and generic way of creating an accurate 3D descriptor for a 3D computer-generated model. The descriptor is invariant to the shape of the model and to the CAD data format being used to store the geometry of the model. The descriptor is also invariant to translation and, in most cases, also invariant to rotation.

Advantageously, the descriptor may further comprise one or more dimension-related features each representing a dimensional feature of the model. This allows models in a database, which are not compatible in size with that which is the subject of the search, to be excluded from the search results.

In an embodiment the model is preferably rotated about one or more of the axes in angular steps of magnitude greater than zero. The angular step is preferably the same for each axis. This reduces computational cost.

Preferably, for simplicity, the plurality of different axes comprises three mutually-perpendicular axes. In this case each angular step is advantageously in the range from 30° to 45°. This allows a good balance between computational cost and accuracy to be achieved.

According to an embodiment of a second aspect there is provided a computer-implemented method of creating a descriptor for a three-dimensional—3D—object, comprising: obtaining at least one two-dimensional—2D—image of the 3D object; and extracting from the or each 2D image a feature vector representing features of the 2D image; wherein the descriptor comprises the extracted feature vector, if there is only one 2D image, or a vector string comprising each of the extracted feature vectors, if there is more than one 2D image; and wherein the descriptor further comprises one or more dimension-related features each representing a dimensional feature of the 3D object.

Such a method can be used even with reduced information, such as where only one or a few views of a 3D object are available instead of the geometry of an entire CAD model. A method can provide a good match even from only a few photographs and even from a sketch, although the accuracy of the descriptor created may be reduced in this case. Also, as indicated above, this method allows models in a database, which are not compatible in size with that which is the subject of the search, to be excluded from the search results.

Methods embodying the first and second aspects may advantageously employ a deep neural network to extract the or each feature vector from the 2D image.

According to an embodiment of a third aspect there is provided a computer-implemented searching method for searching a database of three-dimensional—3D—items for similarity with a specified 3D object or 3D computer-generated model, which searching method comprises: a similarity assessment process in which a feature vector or vectors of a descriptor associated with the specified 3D object/model and feature vectors of descriptors associated with the 3D items in the database are used to ascertain the degree of similarity between the specified 3D object/model and one or more 3D items in the database; wherein each of the descriptors associated with the 3D items in the database was created in accordance with a method embodying the first or second aspect, and the descriptor associated with the specified 3D object was created in accordance with a method embodying the second aspect or the descriptor associated with the specified 3D model was created in accordance with a method embodying the first aspect.

Fast, accurate searches into large databases of 3D items (3D models or representations of physical objects) can be performed using such a method, because it mimics the way humans judge two 3D objects to be similar and uses information from images obtained from multiple angles.

The similarity assessment process preferably further comprises using dimension-related features of the descriptors of the specified 3D object/model and the 3D items in the database to identify any 3D item in the database which is not compatible in size with the specified 3D object/model.

The similarity assessment process may comprise: using the feature vector or vectors of the descriptor associated with the specified 3D object/model to create a feature matrix $fM_s$ for the specified 3D object/model; using the feature vectors of the descriptors associated with the 3D items in the database to create a feature matrix $fM_d$ for each 3D item in the database; appending the feature matrices $fM_d$ created for the 3D items in the database to create a database matrix dM; using the feature matrix $fM_s$ for the specified 3D object/model and the database matrix dM to compute a similarity matrix sM indicative of a distance between each feature vector of the descriptor associated with the specified 3D object/model and each feature vector of the descriptors associated with the 3D items in the database; and deriving a similarity vector sV from the similarity matrix SM, where the similarity vector sV has a length DS and the j-th element of the similarity vector represents a similarity between the specified 3D object/model and the j-th item in the database.

In such a similarity assessment process the number $NR_s$ of rows of the feature matrix $fM_s$ is the same as the number of feature vectors, the number $NC_s$ of columns of the feature matrix $fM_s$ is the same as the number of features in the feature vector or vectors, the i-th row of the feature matrix $fM_s$ corresponds to the i-th feature vector of the descriptor, the number $NR_d$ of rows of the matrix $fM_d$ is the same as the number of feature vectors in the descriptor associated with the database 3D item concerned, the number of columns $NC_d$ of the matrix $fM_d$ is the same as the number of features in each feature vector in the descriptor associated with the database 3D item concerned, the i-th row of the matrix $fM_d$ corresponds to the i-th feature vector of the descriptor associated with the database 3D item concerned, the number of rows in the database matrix dM is $DS*NR_d$, where DS is the total number of items in the database, and the number of columns in the database matrix dM is $NC_d$.

According to an embodiment of a fourth aspect there is provided a computer program which, when run on a computer, causes that computer to carry out a method embodying the first, second and/or third aspect.

According to an embodiment of a fifth aspect there is provided descriptor creation apparatus configured to create a descriptor for a three-dimensional—3D—computer-generated model, which apparatus comprises: an image renderer configured to obtain a plurality of two-dimensional—2D—rendered images of the model from a fixed viewpoint by rotating the model fully about each of a plurality of different axes independently; a feature vector extractor configured to extract from each 2D rendered image a feature vector representing features of the 2D rendered image; and a descriptor assembler configured to form the descriptor by assembling a vector string comprising each of the extracted feature vectors.

Apparatus embodying the fifth aspect can create an accurate 3D descriptor for a 3D computer-generated model. The descriptor is invariant to the shape of the model and to the CAD data format being used to store the geometry of the model. The descriptor is also invariant to translation and, in most cases, also invariant to rotation.

The descriptor assembler is preferably also configured to include in the descriptor one or more dimension-related features each representing a dimensional feature of the model. This allows models in a database, which are not compatible in size with that which is the subject of the search, to be excluded from the search results.

Advantageously, the image renderer may be operable to rotate the model about one or more of the axes in angular steps of magnitude greater than zero. Preferably, the angular step is the same for each axis.

The plurality of different axes desirably comprises three mutually-perpendicular axes. In this case each angular step is preferably in the range from 30° to 45°. This allows a good balance between computational cost and accuracy to be achieved.

According to an embodiment of a sixth aspect there is provided descriptor creation apparatus configured to create a descriptor for a three-dimensional—3D—object, comprising: a feature vector extractor configured to extract from one or more two-dimensional—2D—images of the 3D object respective feature vectors each representing features of the 2D image; and a descriptor assembler configured to form the descriptor from the extracted feature vector, if there is only one 2D image, or to assemble a vector string comprising each of the extracted feature vectors, if there is more than one 2D image; the descriptor assembler being further configured to include in the descriptor one or more dimension-related features each representing a dimensional feature of the 3D object.

Such apparatus can work even with reduced information, such as where only one or a few views of a 3D object are available instead of the geometry of an entire CAD model. Apparatus can provide a good match even from only a few photographs and even from a sketch, although the accuracy of the descriptor created may be reduced in this case. Also, as indicated above, this apparatus allows models in a database, which are not compatible in size with that which is the subject of the search, to be excluded from the search results.

Apparatus embodying the fifth and sixth aspects may advantageously employ a deep neural network to extract the or each feature vector from the 2D image.

According to an embodiment of a seventh aspect there is provided searching apparatus configured to search a database of three-dimensional—3D—items for similarity with a specified 3D object or 3D computer-generated model, which searching apparatus comprises: a similarity assessor configured to use a feature vector or vectors of a descriptor associated with the specified 3D object/model and feature vectors of descriptors associated with the 3D items in the database to assess the degree of similarity between the specified 3D object/model and one or more 3D items in the database; wherein each of the descriptors associated with the 3D items in the database was created by descriptor creation apparatus embodying the fifth or sixth aspect, and the descriptor associated with the specified 3D object was created by descriptor creation apparatus embodying the sixth aspect or the descriptor associated with the specified 3D model was created by descriptor creation apparatus embodying the fifth aspect.

Apparatus embodying the seventh aspect can perform fast, accurate searches into large databases of 3D items (3D models or representations of physical objects), because it mimics the way humans judge two 3D objects to be similar and uses information from images obtained from multiple angles.

The similarity assessor may be further configured to use dimension-related features of the descriptors of the specified 3D object/model and the 3D items in the database to identify any 3D item in the database which is not compatible in size with the specified 3D object/model.

The similarity assessor may comprise: a feature matrix generator configured to use the feature vector or vectors of the descriptor associated with the specified 3D object/model to create a feature matrix $fM_s$ for the specified 3D object/model, where the number $NR_s$ of rows of the feature matrix $fM_s$ is the same as the number of feature vectors, the number $NC_s$ of columns of the feature matrix $fM_s$ is the same as the number of features in the feature vector or vectors, and the i-th row of the feature matrix $fM_s$ corresponds to the i-th feature vector of the descriptor; a database matrix generator configured to (a) use the feature vectors of the descriptors associated with the 3D items in the database to create a feature matrix $fM_d$ for each 3D item in the database, where in each such feature matrix $fM_d$ the number $NR_d$ of rows of the matrix is the same as the number of feature vectors in the descriptor associated with the database 3D item concerned, the number of columns $NC_d$ of the matrix is the same as the number of features in each feature vector in the descriptor associated with the database 3D item concerned, and the i-th row of the matrix corresponds to the i-th feature vector of the descriptor associated with the database 3D item concerned; and (b) append the feature matrices $fM_d$ created for the 3D items in the database to create a database matrix dM, where the number of rows in the database matrix dM is $DS*NR_d$, where DS is the total number of items in the database, and the number of columns in the database matrix dM is $NC_d$; a similarity matrix generator configured to use the feature matrix $fM_s$ for the specified 3D object/model and the database matrix dM to compute a similarity matrix sM indicative of a distance between each feature vector of the descriptor associated with the specified 3D object/model and each feature vector of the descriptors associated with the 3D items in the database; and a similarity vector generator configured to derive a similarity vector sV from the similarity matrix SM, where the similarity vector sV has a length DS and the j-th element of the similarity vector represents a similarity between the specified 3D object/model and the j-th item in the database.

According to an embodiment of an eighth aspect there is provided a method for use in manufacturing a product, the method comprising: providing a database of three-dimensional—3D—items which have been previously manufactured or prepared for manufacture, the database including descriptors associated with each item wherein each of the descriptors associated with the 3D items in the database was created in accordance with a method embodying the first or second aspect; receiving information specifying a product to be manufactured, the information comprising geometric information specifying the geometry of the product; deriving descriptors from the geometric information of the product in accordance with a method embodying the first or second aspect; using a searching method embodying the third aspect to search the database to ascertain the degree of similarity between items in the database and the product to be manufactured; determining which item in the database is the most similar to the product to be manufactured; and retrieving stored manufacturing process information relating to a manufacturing process associated with manufacture of the item determined to be most similar to the product to be manufactured, and using that retrieved information to manufacture the product.

A system employing a searching method or searching apparatus according to an embodiment may be used to determine whether the database of 3D items contains any which are similar to a product which is to be manufactured. In this case an additional parameter stored in the database in association with the items may be the materials from which the items are made, so that this may also be taken into account when deciding how similar the items are to the product. If more than one item in the database is identified as being similar to the product, the items may be ranked according to their degree of similarity with the product to determine which item is most similar to the product. Previously-stored details of the item considered to be similar (or most similar) to the product may, for example, be used to provide a user of the system with a recommendation as to the best manufacturing process to use to make the product and/or a quotation as to how much the product will cost to manufacture and/or a delivery time.

BRIEF DESCRIPTION OF THE DRAWINGS

Reference will now be made, by way of example, to the accompanying drawings, in which.

DETAILED DESCRIPTION

Reference will now be made in detail to the embodiments, examples of which are illustrated in the accompanying drawings, wherein like reference numerals refer to the like elements throughout. The embodiments are described below to explain the embodiments by referring to the figures.

The input for which a descriptor is required may be either:
1. a full 3D model of a physical object, given in a supported geometry format; or
2. only one or a few images (views), such as photographs or drawings, of a physical 3D object.

Figure 1:
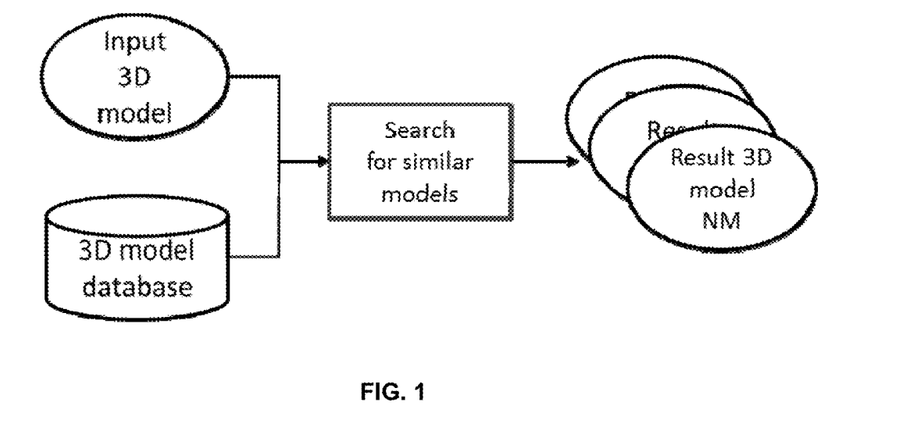
FIG. 1 is a diagram illustrating a process for finding 3D models in a 3D model database which are similar to an input 3D model.

As illustrated in FIG. 1, given an input of a full 3D model and a database of 3D models, an embodiment finds and outputs the 3D models in the database which are most similar in shape to the input 3D model. The search can either be configured to output the most similar NM models, for a given NM (where NM is a positive integer), or all the models whose similarity is above a given similarity measure threshold ST, for a given ST.

Figure 2:
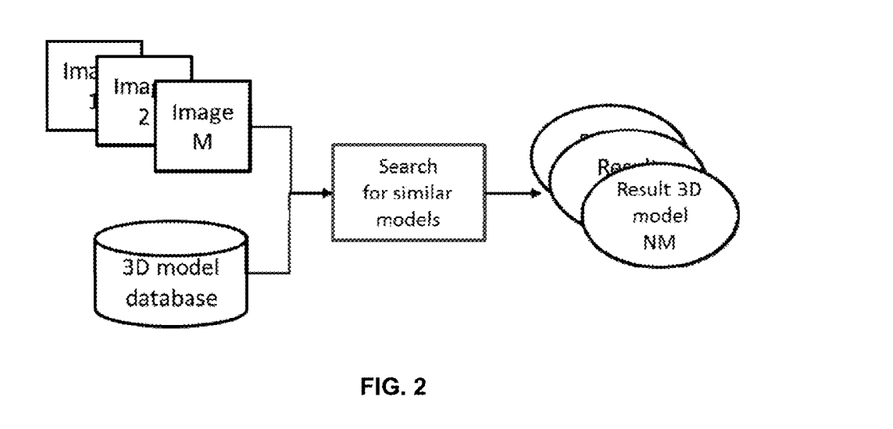
FIG. 2 illustrates a process for finding 3D models in a 3D model database which are similar to a 3D object input as one or more images.

FIG. 2 illustrates a process similar to that of FIG. 1, but taking into account the possibility that the input may in fact be images of a physical 3D object rather than a virtual 3D model. In this case, the same search as in FIG. 1 is carried out, but as will be explained in more detail later the input model is in the form of one or more images of the physical 3D object, preferably taken from different angles.

Figure 3A:
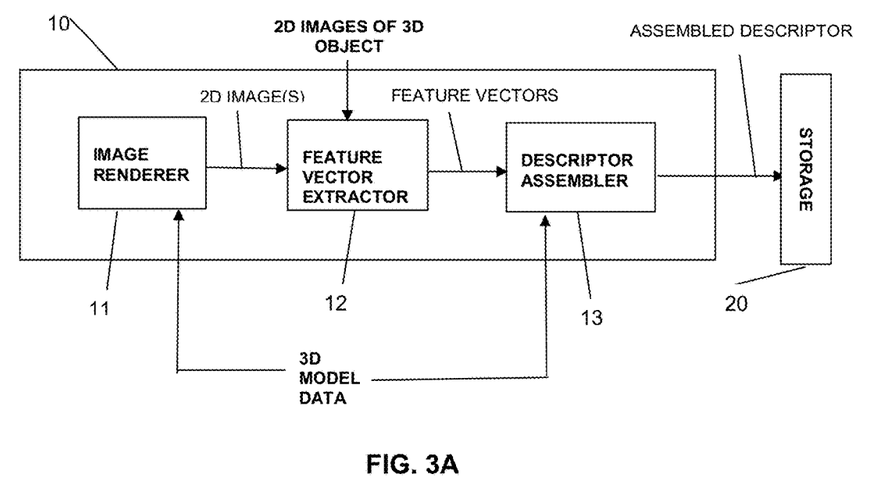
FIG. 3A is a diagram of a descriptor creation apparatus embodiment.

FIG. 3A shows descriptor creation apparatus 10 which is configured to create a descriptor for a three-dimensional—3D—computer-generated model. The apparatus 10, which may comprise a computer processor, comprises an image renderer 11, a feature vector extractor 12 and a descriptor assembler 13. The image renderer 11 is configured to obtain a plurality of two-dimensional—2D—rendered images of the model from a fixed viewpoint by rotating the model fully about each of a plurality of different axes independently. The feature vector extractor 12, which may comprise a deep neural network, is configured to extract from each 2D rendered image a feature vector representing features of the 2D rendered image. The descriptor assembler 13 is configured to form the descriptor by assembling a vector string comprising each of the extracted feature vectors. The assembled descriptor is stored in internal or external storage 20.

The creation of a 3D descriptor for input comprising a full 3D model in accordance with an embodiment will now be described with reference to the flowchart of FIG. 3B. It is assumed that the full 3D model is stored in a standard format, either triangulated (e.g. STL or OBJ) or analytic (e.g. STEP, IGES). Such formats can be read and rendered using many software libraries, two examples being OpenSCAD (http://www.openscad.org/) and OpenCASCADE (http://www.opencascade.com/).

After the 3D model is read into the processor 10 (step S31), a rendering engine (image renderer 11) is used to create one or more views (images) of the 3D model (step S32). A process of creating such images is shown in the flowchart of FIG. 4 and will now be described.

Figure 4:
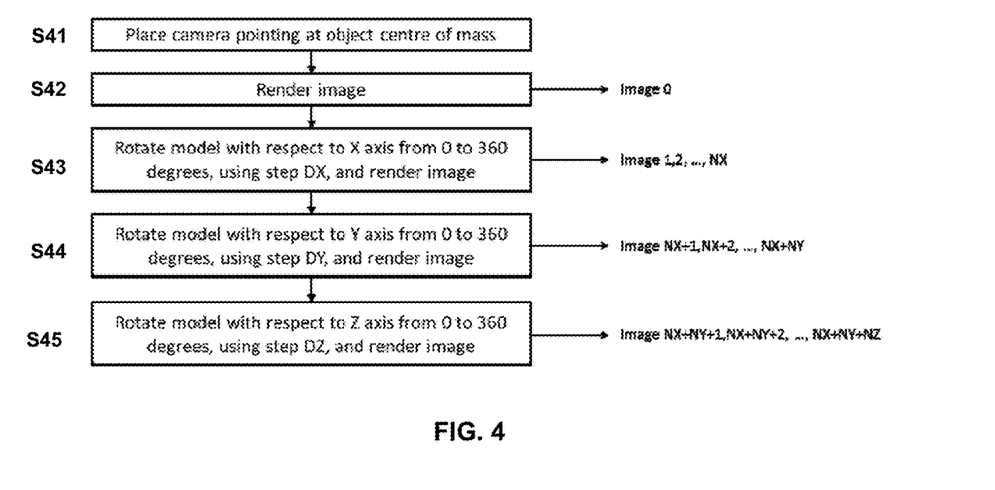
FIG. 4 is a flowchart of a process for rendering a 3D object into a plurality of images.

The process of FIG. 4 comprises rendering images while rotating the 3D model independently about a plurality of different axes, in this example all three axes of the XYZ coordinate system. Firstly, the viewpoint ("virtual camera") from which the images will be rendered is positioned so as to point at the center of mass of the 3D model (step S41) and the first image of the 3D model is rendered (step S42). The 3D model is then rotated with respect to the X axis from 0° to 360° in angular steps DX, an image being rendered at each step, so as to obtain images 1, 2, . . . , NX (step S43). The 3D model is then rotated with respect to the Y axis from 0° to 360° in angular steps DY, an image being rendered at each step, so as to obtain images NX+1, NX+2, . . . , NX+NY (step S44). Finally, the 3D model is rotated with respect to the Z axis from 0° to 360° in angular steps DZ, an image being rendered at each step, so as to obtain images NX+NY+1, NX+NY+2, . . . , NX+NY+NZ (step S45). Angular steps DX, DY, DZ are preferably in the range from 30° to 45°, and advantageously DX=DY=DZ.

The effect of the rotation process is both to increase the amount of information extracted from the 3D model and to ensure that the descriptor is fully or substantially invariant to object rotation. For many practical applications, this method is fully rotation invariant, since for most CAD models the orientation of the 3D model is aligned to one of the axes. The descriptor proposed in the present application would be fully rotation invariant in all cases if a very small rotation angle was used when performing the rendering, but this would require significant computational resources. Accordingly, in exchange for a small reduction in rotational invariance, larger rotation steps are used so that less computational resources are required. For 3D CAD models coming from mechanical design, it has been found that rotational increments or steps DX=DY=DX=45 degrees provides a good balance between computational requirements and accuracy; this results in twenty-two images per 3D model.

Figure 3B:
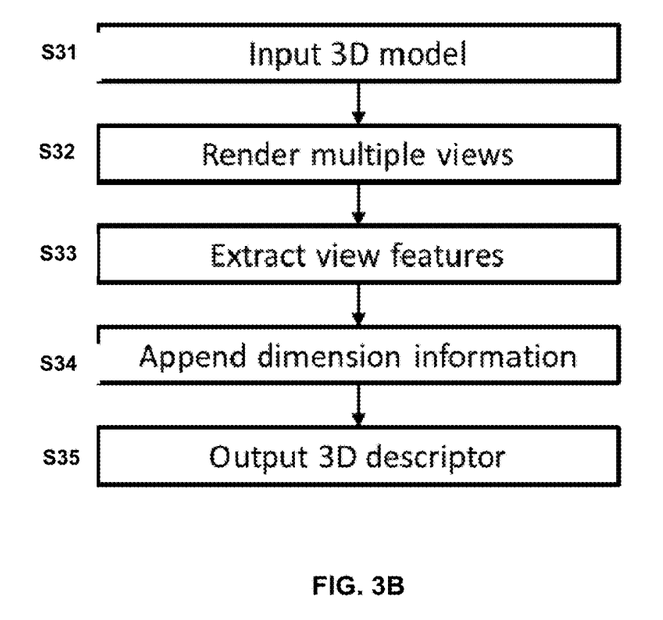
FIG. 3B is a flowchart of a process for creating a descriptor for a 3D model according to an embodiment.

Returning to the process of FIG. 3B, in step S33 a deep neural network (feature extractor 12) is used to extract features from each rendered image. Examples of deep neural networks very suitable for this task are AlexNet (Krizhevsky, Alex, Ilya Sutskever, and Geoffrey E. Hinton. "Imagenet classification with deep convolutional neural networks." *Advances in neural information processing systems*, 2012) and GoogLeNet (Szegedy, Christian, et al. "Going deeper with convolutions." *Proceedings of the IEEE Conference on Computer Vision and Pattern Recognition*. 2015), however other networks could be used instead.

Figure 5:
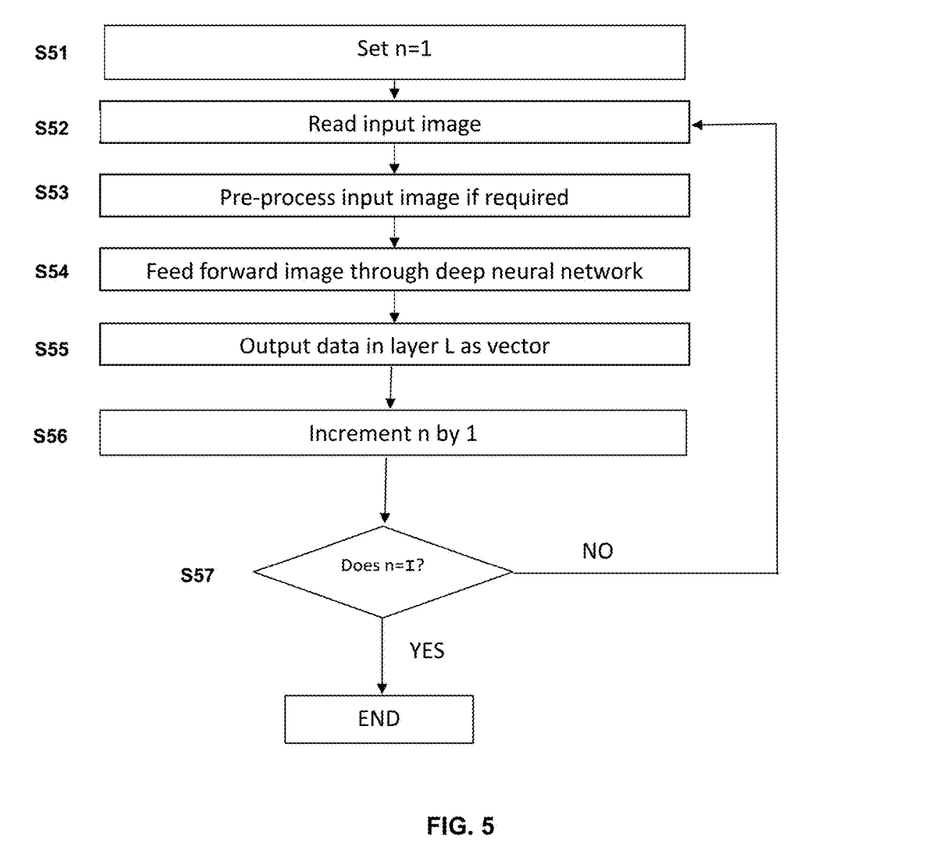
FIG. 5 is a flowchart of a process for converting an image to a feature vector.

Feature extraction may follow the process shown in FIG. 5. Let us assume that there are I images. After reading a first image (steps S51 and S52), pre-processing operations, such as rescaling, mean extraction or color channel swapping, are usually applied in order to make the image compatible with the neural network (step S53). The image data, after any required pre-processing, is placed on the input layer (also called data layer) of the deep neural network and fed forward through the neural network (step S54) until reaching the designated output layer L, which is usually the last, or penultimate layer, in the neural network. The vector of values in layer L is output as the feature vector associated with the input image (step S55). It is preferable that the vector is normalized. The feature extraction process of steps S52 to S55 is repeated until feature vectors for all the I images of the input model have been obtained (steps S56 and S57).

Figure 6:
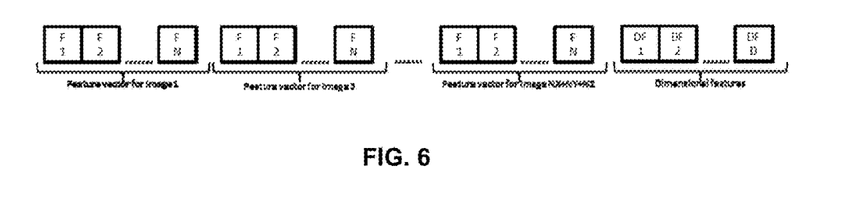
FIG. 6 is a diagram illustrating an assembled descriptor created in accordance with the process of FIG. 3.

Returning to FIG. 3B, in step S34 a number of extra features related to the dimensions of the object are computed. Examples of these features are:
Minimum and maximum dimensions of the bounding box
Surface area
Volume Finally, all the feature vectors of the 3D model and its dimensional features are assembled into one descriptor for the 3D model (step S35). An example of such a descriptor is shown in FIG. 6.

When (as in most cases) the descriptor is rotation invariant, the order of the feature vectors for the images is not important. Also, for computational efficiency it may be preferable that the feature vectors for all images are combined and stored as one contiguous vector, while the dimensional features are stored as a separate vector.

Figure 8:
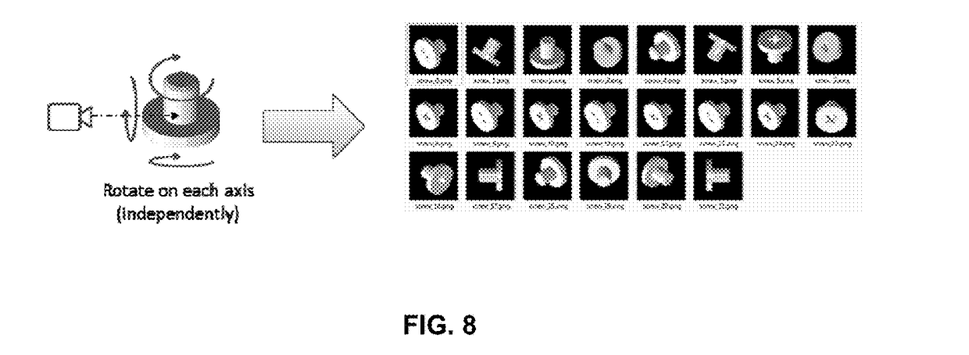
FIG. 8 is a diagram for use in explaining an example of how images of a 3D model are obtained.

By way of example, the creation of a descriptor in respect of a 3D CAD model of a screw will now be described. As shown in FIG. 8, the model is rotated around all three axes independently using rotational increments DX=DY=DZ=45 degrees to produce 22 images of the screw. Some of these images are identical since the screw is rotationally symmetric.

For each image, a GoogLeNet deep neural network is used to extract feature vectors. Firstly, each input image is resized to 256×256 pixels, the pixel mean is extracted, and the data is placed on the input layer (data layer) of the neural network. The data is fed forward through the network and the values of the layer "pool5/7×7_s1" (the penultimate layer) are extracted as a vector of length 1024. Hence each image is transformed into a feature vector of 1024 values. The dimension of the bounding box (3 values) and the total surface area of the model are extracted as dimensional features. Thus, in total, the assembled descriptor (feature vectors of all images and dimensional features) has a length of 22*1024+4=22,532 values.

As described above, the method of FIG. 3B relates to the creation of a descriptor in a case where the input item is a full 3D model. In the case where only images of a physical 3D object are provided, the descriptor creation process comprises extracting feature vectors from the images using the process of FIG. 5 and adding the extracted feature vectors to dimension-related features. A pre-processing step on these images (e.g. cropping, centering, etc.) might be required before feature extraction. Dimension information is more difficult to extract in this case, since a full 3D model is not available. One possible way of extracting a limited set of features, such as the bounding box size information, is by including a calibration target of known size adjacent to the object when creating the image(s). Another possibility is to provide the dimension information manually, for example in the form of a configurable filter. Since it is created from only one or a few images, in this case the descriptor is incomplete (and not rotation invariant). The more features of the object captured in the images, the better the created descriptor will be.

For a database of items comprising 3D computer-generated models the process shown in FIG. 3B is carried out to create and store a descriptor such as the one shown in FIG. 6 for each 3D model. If the items in the database are not computer-generated, i.e. are other representations of physical objects, the modified descriptor creation process described above would be used to create descriptors. Thus in each case a database of 3D descriptors is created. In the case where the stored descriptors relate to 3D computer-generated models, all such descriptors will be rotation invariant, since the 3D data is available for those models.

Figure 7A:
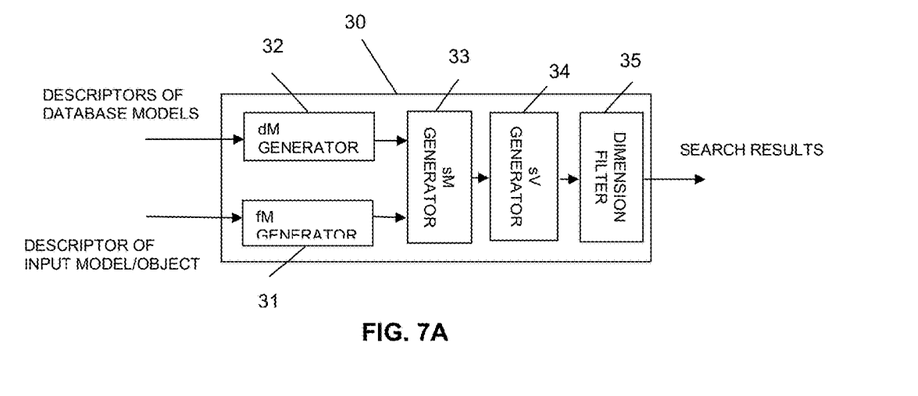
FIG. 7A is a diagram of a similarity assessor.

Once descriptors for the 3D item database have been created, the database can be queried to find 3D items similar to an input model or object. Searching apparatus comprising a similarity assessor 30 as shown in FIG. 7A carries out the search or similarity assessment process shown in FIG. 7B. The similarity assessor 30 comprises a feature matrix generator 31, a database matrix generator 32, a similarity matrix generator 33, a similarity vector generator 34, and a dimension filter 35, and is configured to use the feature vector or vectors of the stored descriptor associated with the specified 3D object/model and the feature vectors of the stored descriptors associated with the 3D items in the database to assess the degree of similarity between the specified 3D object/model and one or more 3D items in the database.

Figure 7B:
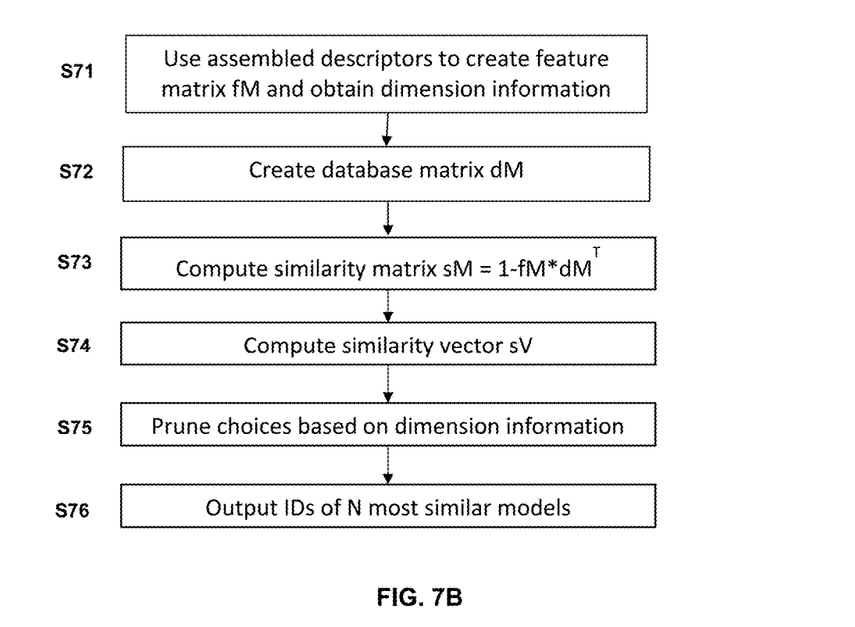
FIG. 7B is a flowchart of a process for finding 3D models in a 3D model database which are similar to an input or specified 3D model.

The first step of the search process of FIG. 7B, carried out by the feature matrix generator 31, is to use the assembled descriptor for the input item to create a feature matrix fM and to extract the dimension-related features (step S71). The feature matrix fM has as many rows as rendered view images (NX+NY+NZ) and as many columns as features in the feature vectors (N). The i-th row of fM corresponds to the feature vector extracted from the i-th rendered image. This information is extracted from the assembled descriptor of the input model, for example by a standard matrix reshape operation (a reshape operation is an operation where a matrix of dimension (M,N) is transformed into a matrix of dimension (xM, N/x), where x has the property that both xM and N/x are integers) on the contiguous vector forming the descriptor so as to present the data in matrix form. If the assembled descriptor has been stored in matrix form, a reshape operation is not needed when extracting the data to form the feature matrix. Dimension information is simply extracted from the assembled descriptor.

Following the creation of a feature matrix fM for the input item as described above, a database matrix dM is created (step S72) by the database matrix generator 32. To create the database matrix, the feature matrix fM for each model in the database is created and then all the rows of those feature matrices fM are appended to create a matrix of size DS*(NX+NY+NZ) rows, where DS is the total number of models in the database, and N columns, where N represents the length of the feature vectors.

Then, the models in the database which are closest to the input item are found using the remaining steps of the search process of FIG. 7B.

Firstly, in step S73, a similarity matrix sM, where $sM=1-fM*dM^T$, is computed by the similarity matrix generator 33. That is sM contains the cosine distance between the feature vectors of each view of the input model and the feature vectors of each view of each model in the database. In the formula for computing sM, the symbol "*" represents matrix multiplication and the superscript "T" represents matrix transposition. Note that this formula assumes that the feature vectors have been normalized.

Next, a reduction operation is performed (step S74) on the matrix sM by the similarity vector generator 34 to compute a similarity vector sV, as described below The vector sV is of length DS, with the j-th element storing the distance between the input model and the j-th model in the database. Here the distance between the i-th view of the input model and the j-th model in the database is defined as the minimum cosine distance between the feature vector corresponding to the i-th view of the input model (in other words, the i-th row of sM) and the feature vectors corresponding to all views of the j-th model in the database. The distance between the input model and j-th model in the database is defined as the summation over all the distances between the views of the input model and j-th model in the database.

After the similarity vector sV, i.e. the distance the input model and all models in the database, has been computed, the models from the database that do not satisfy the dimensionality criteria are removed (step S75) by the dimension filter 35. Lastly, an ordered vector of model IDs for the models which have been found to be similar is output (step S76), with the first one being that with the smallest distance (i.e. closest similarity) to the input model.

Figure 9:
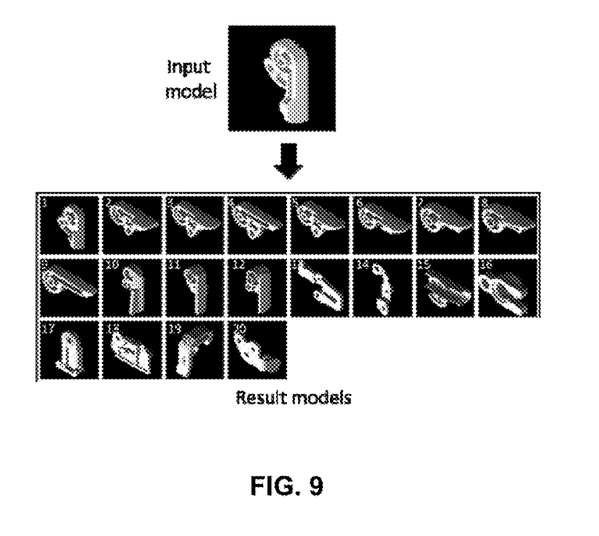
FIG. 9 is a diagram for use in explaining an example of how 3D models similar to an input model are found.

By way of example, a process for finding in a database 3D models similar to a particular input 3D model will be described with reference to FIG. 9. The input model in this example is shown at the top of FIG. 9, and has been processed as described above in order to obtain a descriptor for the input model. A search is conducted in a 3D model database for 3D models similar to the input model. Each 3D model in the 3D model database (containing, for example, approximately 8000 3D CAD models) will have been converted into a descriptor using the descriptor assembly process described above. That is, 22 images of each 3D model in the database will have been produced, for each of which a feature vector was obtained, each descriptor comprising all the feature vectors of the 3D model concerned and its dimensional features.

The feature matrix fM, containing the features of the input model, has 22 rows and 1024 columns while the database matrix has 8,000*22=176,000 rows and 1024 columns. The similarity matrix sM, which has 22 rows and 176,000 columns, is then computed. The similarity matrix sM shows the distance between the feature vectors of each of the 22 images of the input model and those of the feature vectors of all images of all 3D models in the database. Following the above-mentioned reduction operation, a similarity vector sV is obtained which has 8,000 elements that represent the distance between the input model and all models in the database. The results are then ordered by distance, those which show a relative difference in dimension features larger than 200% are removed, and (as shown at the bottom of FIG. 9) the most similar 20 models are output.

Embodiments can be applied in any field that requires searching for 3D data. Examples are mechanical design, 3D printing, etc. Embodiments can also be applied in fields where an input 3D model is not available, such as object recognition from live cameras.

A particular application of an embodiment is described below with reference to FIG. 10.

Figure 10:
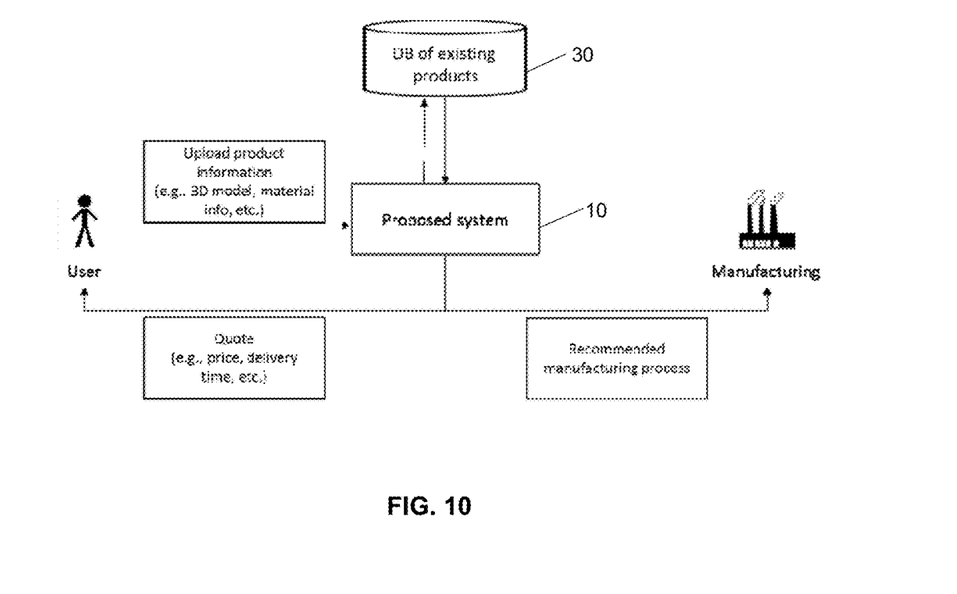
FIG. 10 is a diagram of a system according to an embodiment.

FIG. 10 is a diagram of a system 10 employing a database searching method according to an embodiment for use in the manufacture of a product. A user of system 10, who depending on the circumstances may for example be a customer or an employee of a company to which the system belongs, provides the system 10 with information about the product to be manufactured in order to ascertain the best (for example, the most energy efficient) manufacturing process and, optionally, also an estimate of the cost and delivery time associated with the best manufacturing process. In this example the product is a bespoke one and as such is slightly different from the products manufactured in the past. The information provided by the user falls into the following categories:
  Geometric information (e.g. a CAD model),
  Numeric information (e.g. tolerances)
  Non-numeric information (e.g. material information)
  Information relating to previously-manufactured products is stored in a product database 30. Geometric information relating to each product is held in the database in the form of a descriptor which has been derived from the products using the above-described descriptor assembly process. The database 30, or a separate database, holds other information relating to the products in both text and numeric formats that is referred to hereafter as metadata. The metadata can be split into three categories:
  1. Product specification metadata, which includes material properties, tolerances and any other information required to describe the product to a level that enables it to be manufactured
  2. Manufacturing process metadata (i.e. accumulated manufacturing knowhow), which includes information regarding the manufacturing process to be used, such as the stages of the manufacturing process, machine parameters, energy usage, materials usage, etc.
  3. Manufacturing cost, selling price, delivery time, etc. (which are likely to be dependent upon the manufacturing process that was used).

The system 10, upon receiving the required information from the user regarding the product to be manufactured, uses information extracted from similar previously-manufactured products found in the database 30 to generate one or both of the following outputs:
  A recommendation for the best manufacturing process to be used to manufacture that product
  Under the assumption that the recommended manufacturing process will be used, a quote with information such as cost, delivery time and so on.

In particular, the system 10 employs a searching method according to an embodiment to determine whether the database 30 contains any items which are similar to the product which is to be manufactured. In this case searching is carried out using a feature vector obtained by appending a feature vector or vectors derived from stored item metadata to feature vectors extracted from the stored item descriptors. If more than one item in the database is identified as being similar to the product, the items are ranked according to their degree of similarity with the product to determine which item is most similar to the product. The previously-stored details of the item considered to be similar (or most similar) to the product are used to provide the user of the system with the required information, i.e. a recommendation as to the best manufacturing process to use to make the product and/or a quotation as to how much the product will cost to manufacture and/or a delivery time.

Embodiments may be implemented in hardware, or as software modules running on one or more processors, or on a combination thereof. That is, those skilled in the art will appreciate that a microprocessor or digital signal processor (DSP) may be used in practice to implement some or all of the functionality described above.

The embodiments may also be one or more device or apparatus programs (e.g. computer programs and computer program products) for carrying out part or all of the methods described herein. Such programs may be stored on computer-readable media, or could, for example, be in the form of one or more signals. Such signals may be data signals downloadable from an Internet website, or provided on a carrier signal, or in any other form.

Figure 11:
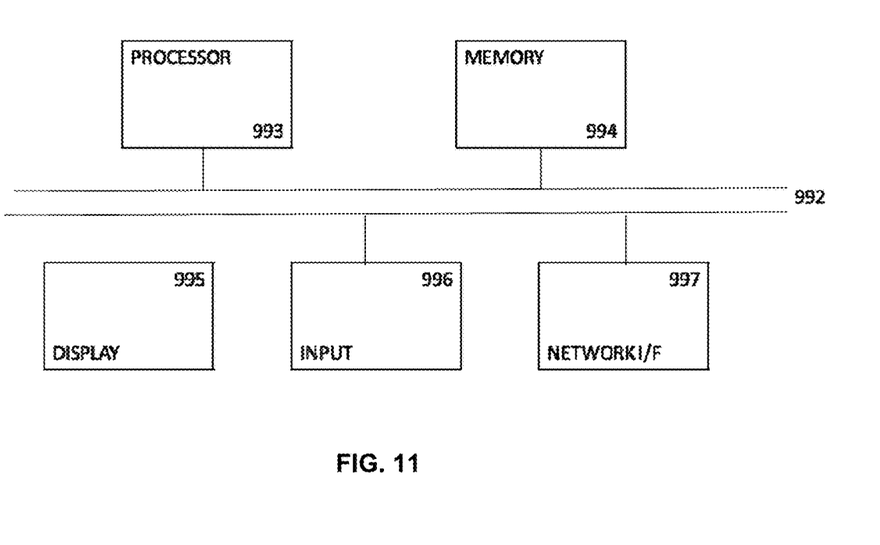
FIG. 11 is a block diagram of a computing device suitable for carrying out a method embodiment.

FIG. 11 is a block diagram of a computing device, such as a data storage server, and which may be used to implement some or all of the steps of a method, and perform some or all of the tasks of apparatus of an embodiment. For example, the computing device of FIG. 11 may be used to implement all the steps of the descriptor creation method of FIG. 3B and the database searching method illustrated in FIG. 7B and perform all the tasks of the descriptor creation apparatus shown in FIG. 3A and the database searching apparatus of FIG. 7A, or only to implement some of the steps in the method of FIG. 3B or 7B, and only to perform some of the tasks of the apparatus in FIG. 3A or 7A.

The computing device comprises a processor 993, and memory, 994. Optionally, the computing device also includes a network interface 997 for communication with other such computing devices, for example with other computing devices.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing computer program code stored in the memory 994 to implement the methods described with reference to FIGS. 3, 4, 5, 7B, 8, 9 and/or 10 and defined in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 995 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network.

Other peripheral devices such as microphone, speakers, printer, power supply unit, fan, case, scanner, trackball etc may be included in the computing device.

Methods may be carried out on a computing device such as that illustrated in FIG. 11. Such a computing device need not have every component illustrated in FIG. 11, and may be composed of a subset of those components. A method may be carried out by a single computing device in communication with one or more data storage servers via a network. The computing device may be a data storage itself storing at least a portion of the data. Methods embodying the embodiments may be stored on a non-transitory computer readable storage medium.

A method may be carried out by a plurality of computing devices operating in cooperation with one another. One or more of the plurality of computing devices may be a data storage server storing at least a portion of the data.

The above-described embodiments may advantageously be used independently of any other of the embodiments or in any feasible combination with one or more others of the embodiments.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A non-transitory computer-readable medium encoded with a computer program for carrying out a searching method for searching a database of three-dimensional (3D) items for similarity with a specified 3D object and a 3D computer-generated model, which searching method comprises:
    a similarity assessment process in which one of a feature vector and feature vectors of a descriptor associated with the one of the specified 3D object and the model and feature vectors of descriptors associated with 3D items in the database are used to ascertain a degree of similarity between the one of the specified 3D object and the model and one or more of the 3D items in the database, the similarity assessment process further comprising using dimension-related features of the descriptors of the one of the specified 3D object and model and the 3D items in the database to identify any 3D item in the database which is not compatible in size with the one of the specified 3D object and model;
    wherein each of the descriptors associated with the 3D items in the database being created by:
        obtaining a plurality of two-dimensional (2D) rendered images of the item from a fixed viewpoint by rotating a 3D computer-generated model of the item fully about each of a plurality of different axes independently; and
        extracting from each 2D rendered image a feature vector representing features of each 2D rendered image, wherein the descriptor comprises a vector string, comprising each of feature vectors extracted, and further comprises at least one dimension-related feature representing a dimensional feature of the item, the dimensional feature of the item being at least one of minimum and maximum lengths of the item, surface area of the item, and volume of the item;
    wherein the descriptor associated with the specified 3D object being created by:
        obtaining at least one two-dimensional (2D) image of the 3D object; and
        extracting from the at least one 2D image a feature vector representing features of the 2D image, the descriptor comprising one of the feature vector extracted, when there is only one 2D image, and a vector string comprising each of the feature vectors extracted, when there is more than one 2D image, the descriptor further comprising at least one dimension-related feature representing a dimensional feature of the 3D object, the dimensional feature of the 3D object being at least one of minimum and maximum lengths of the object, surface area of the object, and volume of the object; and wherein the descriptor associated with the specified 3D model being created by:

obtaining a plurality of two-dimensional (2O) rendered images of the model from a fixed viewpoint by rotating the model fully about each of a plurality of different axes independently; and extracting from each 2D rendered image a feature vector representing features of each 2D rendered image, wherein the descriptor comprises a vector string, comprising each of feature vectors extracted, and further comprises at least one dimension-related feature representing a dimensional feature of the model, the dimensional feature of the model being at least one of minimum and maximum lengths of the model, surface area of the model, and volume of the model.

2. A non-transitory computer-readable medium as claimed in claim 1, wherein the similarity assessment process comprises:

using the one of the feature vector and feature vectors of the descriptor associated with the one of the specified 3D object and the model to create a feature matrix $fM_s$ for the one of the specified 3D object and model;

using the feature vectors of the descriptors associated with the 3D items in the database to create a feature matrix $fM_d$ for each 3D item in the database;

appending feature matrices $fM_d$ created for the 3D items in the database to create a database matrix dM;

using the feature matrix $fM_s$ for the one of the specified 3D object and the model and the database matrix dM to compute a similarity matrix sM indicative of a distance between each feature vector of the descriptor associated with the one of the specified 3D object and the model and each feature vector of the descriptors associated with the 3D items in the database; and deriving a similarity vector sV from the similarity matrix sM, where the similarity vector sV has a length DS, where DS is a total number of items in the database, and a j-th element of the similarity vector represents a similarity between the one of the specified 3D object and the model and a j-th item in the database.

3. A non-transitory computer-readable medium as claimed in claim 2, wherein:

a number $NR_s$ of rows of the feature matrix $fM_s$ is same as a number of feature vectors of the descriptor, a number $NC_s$ of columns of the feature matrix $fM_s$ is a same as the number of features in the feature vector or the feature vectors of the discriptor, and an i-th row of the feature matrix $fM_s$ corresponds to an i-th feature vector of the feature vectors of the descriptor;

in each such feature matrix $fM_d$ a number $NR_d$ of rows of the feature matrix $fM_d$ is same as the number of feature vectors in the descriptor associated with a respective database 3D item, a number of columns $NC_d$ of the $fM_d$ matrix $fM_d$ is same as the number of features in each feature vector in the descriptor associated with the respective database 3D item, and the i-th row of the feature matrix $fM_d$ corresponds to the i-th feature vector of the feature vectors of the descriptor associated with the database 3D item concerned; and a number of rows in the database matrix dM is $DS*NR_d$ and a number of columns in the database matrix dM is the $NC_d$.

4. A non-transitory computer-readable medium encoded with a computer program for carrying out a method for use in manufacturing a product, the method comprising:

providing a database of three-dimensional (3D) items which have been one of previously manufactured and prepared for manufacture, the database including descriptors associated with each item, each of the descriptors associated with the 3D items in the database being created by obtaining a plurality of two-dimensional (2D) rendered images of a 3D computer-generated model of the item from a fixed viewpoint by rotating the model of the item fully about each of a plurality of different axes independently, and extracting from each 2D rendered image a feature vector representing feature of each 2D rendered image, wherein the descriptor comprises a vector string comprising each of feature vectors extracted;

receiving information specifying a product to be manufactured, the information comprising geometric information specifying a geometry of the product;

deriving descriptors from the geometric information of the product, each of the descriptors derived from the geometric information of the product being created by obtaining a plurality of two-dimensional (2D) rendered images of a 3D computer-generated model of the product from a fixed viewpoint by rotating the model of the product fully about each of a plurality of different axes independently, and extracting from each 2D rendered image a feature vector representing features of each 2D rendered image, wherein the descriptor comprises a vector string comprising each of feature vectors extracted;

searching the database to ascertain a degree of similarity between items in the database and the product to be manufactured by carrying out a similarity assessment process in which feature vectors of a descriptor associated with the product and feature vectors of descriptors associated with 3D items in the database are used to ascertain a degree of similarity between the product and at least one 3D item in the database;

determining which item in the database is most similar to the product to be manufactured; and retrieving stored manufacturing process information relating to a manufacturing process associated with manufacture of the item determined to be most similar to the product to be manufactured, and using that retrieved information to manufacture the product.

5. A searching apparatus configured to search a database of three-dimensional (3D) items for similarity with one of a specified 3D object and 3D computer-generated model; which searching apparatus comprises:

a processor to use one of a feature vector- and feature vectors of a descriptor associated with the one of the specified 3D object and the model and feature vectors of descriptors associated with 3D items in the database to assess a degree of similarity between the one of the specified 3D object and the model and one or more 3D items in the database, processor is to further use dimension-related features of the descriptors of the one of the specified 3D object and the model and the 3D items in the database to identify any 3D item in the database which is not compatible in size with the specified 3D object/model;

wherein each of the descriptors associated with the 3D items in the database being created by:

obtaining a plurality of two-dimensional (2D) rendered images of the item from a fixed viewpoint by rotating a 3D computer-generated model of the item fully about each of a plurality of different axes independently; and extracting from each 2D rendered image a feature vector representing features of each 2D rendered image, wherein the descriptor comprises a vector string, comprising each of feature vectors extracted, and further comprises at least one dimension-related feature representing a dimensional feature of the item, the dimensional feature of the item being at least one of minimum and maximum lengths of the item, surface area of the item, and volume of the item;

wherein the descriptor associated with the specified 3D object being created by:

obtaining at least one two-dimensional (2D) image of the 3D object, ; and extracting from the at least one 2D image a feature vector representing features of the 2D image, the descriptor comprising one of the feature vector extracted, when there is only one 2D image, and a vector string comprising each of the feature vectors extracted, when there is more than one 2D image, the descriptor further comprising at least one dimension-related feature representing a dimensional feature of the 3D object, the dimensional feature of the 3D object being at least one of minimum and maximum lengths of the object, surface area of the object, and volume of the object; and wherein the descriptor associated with the specified 3D model being created by:

obtaining a plurality of two-dimensional (2D) rendered images of the model from a fixed viewpoint by rotating the model fully about each of a plurality of different axes independently; and extracting from each 2D rendered image a feature vector representing features of each 2D rendered image, wherein the descriptor comprises a vector string, comprising each of feature vectors extracted, and further comprises at least one dimension-related feature representing a dimensional feature of the model, the dimensional feature of the model being at least one of minimum and maximum lengths of the model, surface area of the model, and volume of the model.

* * * * *